May 24, 1932.  P. N. COBB, SR  1,859,328
EMERGENCY BRAKE AND IGNITION AND STARTER CONTROL
Filed Oct. 1, 1928
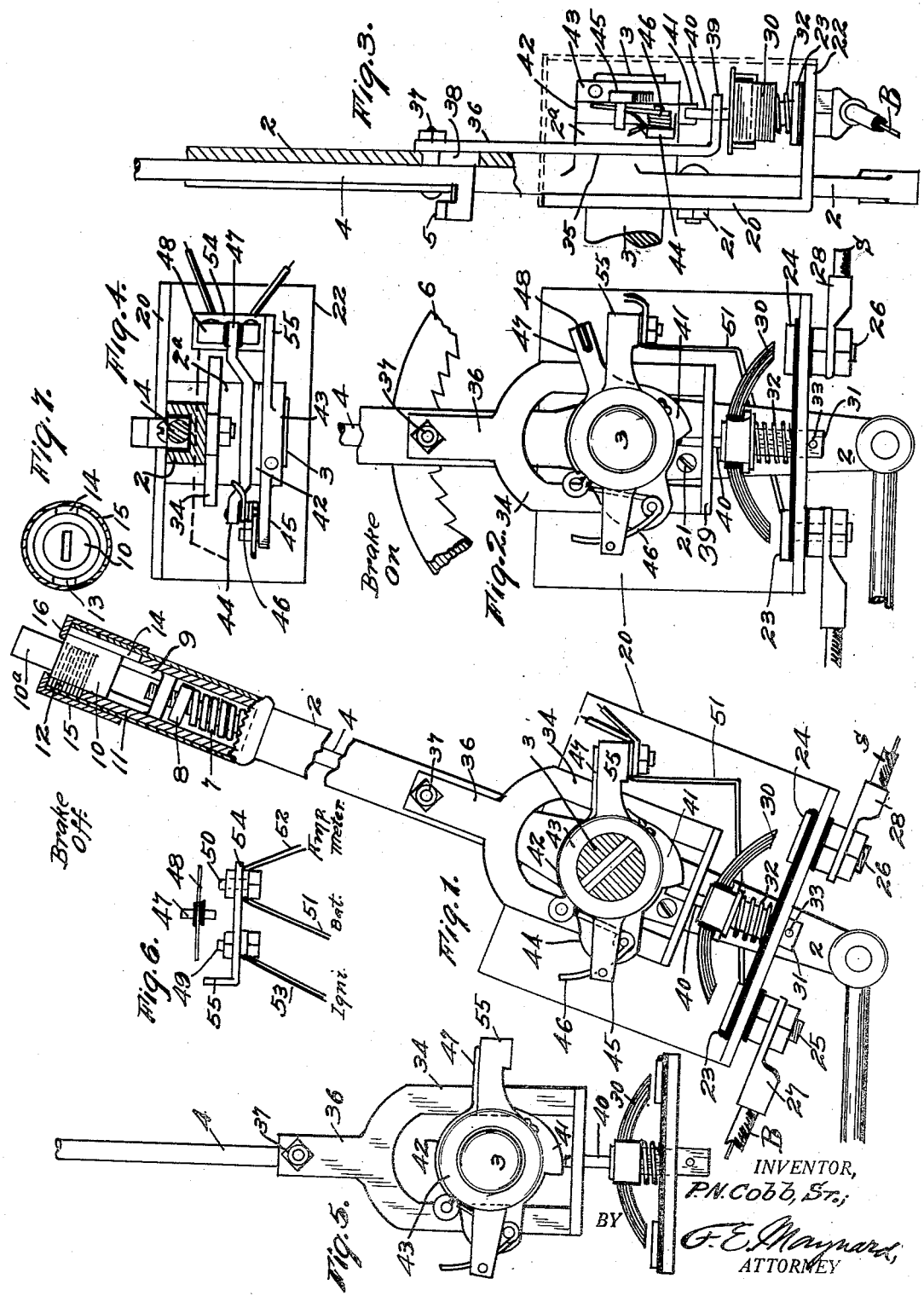
INVENTOR,
P. N. Cobb, Sr.;
BY
G. E. Maynard,
ATTORNEY Patented May 24, 1932

1,859,328

UNITED STATES PATENT OFFICE

PEREZ N. COBB, SR., OF HERMOSA BEACH, CALIFORNIA

EMERGENCY BRAKE AND IGNITION AND STARTER CONTROL

Application filed October 1, 1928. Serial No. 309,667.

This invention relates to a control means for motor vehicles and more especially to an emergency brake lock and ignition and starter control means.

The general object of the present invention is to provide means combined with the emergency brake to control the ignition and starter circuits.

A further object is to provide means for locking the emergency and at the same time locking the ignition and starter circuit control.

Another object is to provide means for automatically breaking the ignition circuit concurrently with the setting of the brake lever, and to provide means enabling the setting of the brake lever without breaking the ignition circuit.

An additional object is to provide an ignition circuit control means which will permit the closing of the ignition circuit at any position in which the brake lever may be set, and which will also permit the closing of the starter circuit at any position of the brake lever.

A still further object is to provide a means combined with the emergency brake lever and which operates automatically to kill the motor with the purpose of avoiding the common practice of starting the motor and vehicle while the brake is set.

A further purpose is to provide a triple function brake and circuit control means of very simple and practicable construction, and of efficient and reliable operation, and which may be readily installed in place in association with most of the standard brake levers of vehicles with little or no change in the parts thereof.

Other objects, features, and advantages, and details of the combination and operation will be made manifest in the ensuing description of the herewith illustrative embodiment; it being understood that modifications, variations and adaptations may be resorted to within the spirit, scope and principle of the invention as it is more directly claimed hereinafter.

Figure 1 is a side elevation and partial section of the device showing the brake lever in released position, with the ignition circuit closed.

Figure 2 is an elevation showing the brake lever in set position with the circuit switch open.

Figure 3 is an end or edge view of the device, partly in section.

Figure 4 is a plan and partial section of the device.

Figure 5 is a detail, elevation showing the igntion switch closed while the brake lever is in set position.

Figure 6 is a detail end view of the ignition switch blade and its contacts, in open position.

Figure 7 is an end plan and partial section of the lever lock means.

The present invention is operatively associated with a standard emergency brake lever 2 pivoted on a trunnion 3 commonly fixed to the frame structure of a motor vehicle. The lever 2 carries a spring-retracted latch part 4 having a latch tooth 5 springing into engagement with a rack-segment 6 which is concentric with the trunnion.

The upper end of the latch 4 is surrounded by its spring 7 which reacts against a collar 8 above which is a yoke 9 which screws on the end of the latch 4 and is attached to a lock-body 10 which is turnable in the handle box 11 of the brake lever 2. In the lock-body 10 is a set of tumblers 12 operative by a suitable key, not shown, to withdraw them from a keeper-slot 13 so as to allow the tumblers to be turned around to a slot 14 which is of such length as to allow the lock-body 10 to be depressed not only to unlock the tooth 5 from the rack 6 but to permit the depression of a tripper means described hereinafter. The slot 13 in the handle 11 is of such length that when the tumblers 12 are projected thereinto the lock-body 10, which has a thumb button 10ª can not be depressed and is therefore in locked condition. A ferrule 15 is secured on the handle 11 and has an inturned lock holding flange 16.

Secured to the lower end of the brake lever 2 is a cheek plate 20 secured by a bolt 21 to the lever and having a flange or shelf 22 extending laterally and having secured thereon contact heads 23 and 24 with binding screws 25 and 26 receiving terminals 27 and 28; the former connected to a battery cable B and the latter to a starter cable S; these being insulated from the shelf 22.

Operative above the contact heads 23—24 is a spring contact bridge 30 which is securely mounted on and insulated from a stem 31 non-rotatively but slidably mounted in the shelf 22. The stem 31 is surrounded by a lift spring 32 operative to shift the contact bridge 30 from the contacts 23—24 to break the starter circuit; its movement being limited by a stop pin 33.

Means are provided and combined with the brake latch 4 whereby to close the starter circuit by moving the contact bridge 30 into engagement with the contact heads 23 and 24, and, further, this means has the additional function of releasing an open ignition switch at will to close the ignition circuit. As here shown this means includes a yoke 34 whose arms slide and are guided in channels 35 cut in the hub 2ª of the lever 2 and whose stem 36 is attached by a bolt 37 to the lower end of the lever latch 4; the lever being slotted at 38 to allow the desired stroke of the yoke 34. The lower end of the yoke is provided with a lateral cross-bar 39 disposed over the contact bridge 30 and slidably receiving a striker or pin 40 fixed to the contact bridge 30.

The striker pin 40 is normally thrust by the spring 32 upward into the path of a lug 41 of a collar 42 turnably mounted on the trunnion 3 between the hub 2ª and a fixed collar 43 on the trunnion. The collar 42 is provided with an arm 44 extending therefrom beside an arm 45 of the fixed collar 43 and a spring device 46 is operative between the arms 44 and 45 to automatically rotate the collar 42 in a direction tending to close a switch-arm 47, carrying an insulated switch blade 48 (to close the blade down on contacts 49—50; the latter being connected by a line 51 to the battery contact 25 and also having a line 52 leading to the ampere meter circuit while the contact 49 has a line 53 leading to the primary ignition circuit. Therefore when the switch arm 47 is free it normally rests in circuit closing position on contacts 49—50.

The contacts 49—50 are mounted on a bar 54 attached to an arm 55 which is attached to the fixed collar 43 and therefore forms a stationary part with the trunnion 3.

The operation is as follows: When the brake lever 2 is in the released position, Fig. 1, the spring 7 serves, through the latch 4, to pull the yoke 34 with its cross-bar 39 upward and the spring 32 is independently thrusting the striker pin 40 upwardly and in front of the nose of the lug 41 with the starter switch 30 in full open position and with the ignition switch blade 48 in circuit closing position on contacts 49—50. If now the brake lever is pulled up to the position shown in Fig. 2 to set the brakes the result is that the pin 40 holds the lug 41 and its collar 42 to act with and as a part of the lever mechanism with the consequence that as the lever moves up the ignition circuit blade 48 is instantly lifted from the contacts 49—50 and the ignition circuit is broken.

However, it is possible by the present device to pull up the lever 2 to apply the brakes without lifting the switch blade 48 and without breaking its circuit. This is done by depressing the lock button 10ª and with it the yoke 34 until the cross-bar 39 engages the head of the stem 31 and carries the striker pin 40 down below the ridge of the lug 41 of the switch collar 42 so that the pin 40 will sweep under the lug 41 to the position shown in Fig. 5 without breaking the motor circuit.

When the brake is set and assuming that the motor is dead in order to start the motor the lever button 10ª is pushed down first to release the lug 41 by retracting its holding pin 40, allowing the switch 48 to close automatically, and further depressing the yoke 34 to push the bar 39 against the starter bridge 30 to close it on contacts 23—24 to close the starter circuit.

It will be seen that all of the mechanism except the fixed collar 43 carrying the contacts 49—50 is associated with the lever 2 and the mounting member 20—22 and therefore swing with actions of the lever 2. When the lever is pulled to apply the brakes the striker pin 40 bears against the lug 41 of the collar 42 and the switch arm 47 moves as a part of the lever and breaks the ignition circuit unless, as before stated the operator depresses pin 40 so that the brake lever can be moved without stopping the motor.

The brake can be released without starting the motor by throwing the lever forward and the ignition circuit can be at once broken by pulling up the lever one notch.

What is claimed is:

1. A combined brake lever, ignition switch and motor starter switch; said motor switch being controlled by the lever and the starter being operative at any position of the lever, and all controlled by a lock as a unit.

2. An ignition circuit switch, a motor starter circuit switch, a brake lever, and means operatively combining said switches and the lever, and including a switch closing actuator and a release control carried by the lever.

3. An ignition circuit switch, a motor starter circuit switch, a brake lever, and means operatively combining said switches and the lever, and including an actuator for said switches carried by the lever.

4. An ignition switch, a motor starter switch, and a brake lever having means for automatically opening the ignition switch as the lever is moved to apply the brakes, and control means carried by the lever for effecting the closing of the ignition switch at any position of the set lever and for operating the starter switch.

5. An ignition switch, a motor starter switch, and a brake lever having means for automatically opening the ignition switch as the lever is moved to apply the brakes, and control means for effecting the closing of the ignition switch at any position of the set lever, and for closing the starter switch to start the associated motor.

6. An ignition switch, a motor starter switch, and a brake lever having means for automatically opening the ignition switch as the lever is moved to apply the brakes, and control means for effecting the closing of the ignition switch at any position of the set lever, and for closing the starter switch to start the associated motor, said control means being operatively mounted on the lever and having a part exposed for manual operation by the driver's hand applied to the lever.

7. A brake lever operating on and operatively carrying a motor starter switch, and means operatively mounted on the lever for closing the switch at any position of the lever.

8. A brake lever carrying a motor starter switch, and means for closing the switch at any position of the lever, and an ignition switch which is opened and closed by the lever.

9. An oscillative brake lever, a self-closing ignition switch which is opened by setting action of the lever, and a trip device mounted on the lever and operative to release the switch at any position of the lever.

10. An oscillative brake lever, a self-closing ignition switch, and a trip device mounted on the lever and effective to open the switch as the lever is moved in one direction and having means to release the switch to close at any position of the lever.

11. An oscillative brake lever, a self-closing ignition switch, and a trip device mounted on and moving with the lever and effective to open the switch as the lever is moved in one direction said device including a lug to push the switch open as the lever is drawn one way, said device being under immediate control of a driver's hand while applied to the lever.

12. In combination, an emergency brake lever, and ignition and motor starter circuit control means carried by said lever, the ignition being controlled by the lever and the starter operative at any position of the lever.

13. An emergency brake system including a control lever, and starter control means carried by said lever and operative thereby, independent of its position.

PEREZ N. COBB, Sr.